(12) United States Patent
Butterworth (10) Patent No.: US 6,871,272 B2
(45) Date of Patent: Mar. 22, 2005

(54) DATA SORTING IN INFORMATION STORAGE SYSTEMS

(75) Inventor: Henry Esmond Butterworth, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 596 days.

(21) Appl. No.: 09/946,745

(22) Filed: Sep. 4, 2001

(65) Prior Publication Data

US 2002/0073285 A1 Jun. 13, 2002

(30) Foreign Application Priority Data

Sep. 9, 2000 (GB) .............................................. 0022131

(51) Int. Cl.[7] .............................................. G06F 12/00
(52) U.S. Cl. ........................ 711/167; 711/112; 711/165; 707/206
(58) Field of Search ........................ 711/111–114, 167, 711/165; 710/52, 53, 57; 707/205, 206

(56) References Cited

U.S. PATENT DOCUMENTS

| | | | | |
|---|---|---|---|---|
| 5,530,850 A | * | 6/1996 | Ford et al. .................. | 707/206 |
| 5,537,588 A | * | 7/1996 | Engelmann et al. ........ | 707/202 |
| 5,551,003 A | * | 8/1996 | Mattson et al. ............. | 711/136 |
| 5,557,770 A | * | 9/1996 | Bhide et al. ................ | 711/161 |
| 6,473,830 B2 | * | 10/2002 | Li et al. ...................... | 711/112 |

OTHER PUBLICATIONS

Okamura et al., On the Feect of Power Saving by Auto–Sleep Function of a Computer System by a Renewal Process, Jun. 1998, Information Processing Society of Japan, vol.39, No. 6.*

Menon et al., An age–threshold algorith for garbage collection in log–structured arrays and file systems, 1998, IBM.*

* cited by examiner

Primary Examiner—Matthew Kim
Assistant Examiner—Woo H. Choi (57) ABSTRACT

A method for data sorting in an information storage system and an information storage system (104) are described. The information storage system (104) is a log structured system having storage devices (106) in which information segments (202, 204) are located. Units of data are sorted into streams (136, 138) according to the expected time until the next rewrite of the unit of data. Sorting data into streams (136, 138) improves the efficiency of free space collection in the storage devices (106). Separate streams (136, 138) are provided for rewritten data units and units of data being relocated due to free space collections in the storage devices (106). The streams (136, 138) can have fixed or dynamic boundaries.

33 Claims, 4 Drawing Sheets

DATA SORTING IN INFORMATION STORAGE SYSTEMS

FIELD OF THE INVENTION

This invention relates generally to information storage systems and, more particularly, to a method and system of sorting data for storage in segments in log structured storage systems.

BACKGROUND OF THE INVENTION

Log structured storage systems have been developed as a form of disk storage management to improve disk access time. Log structured file systems use the assumption that files are cached in a main memory and that increasing memory sizes will make the caches more effective at responding to read requests. As a result, disk use is dominated by writes. A log structured file system writes all new information to disk in a sequential structure call a log. New information is stored at the end of the log rather than updated in place, to reduce disk seek activity. As information is updated, portions of data records at intermediate locations of the log become outdated. This approach increases write performance by eliminating almost all seeks. The sequential nature of the log also permits faster crash recovery.

Some file systems incorporate the use of logging as an auxiliary structure to speed up writes and crash recovery by using the log only for temporary storage; the permanent home for information is in a traditional random access storage structure on disk.

In a log structured file system, data is stored permanently in the log and there is no other structure on disk. The log contains indexing information so that files can be read back with efficiency. Initially all the free space is in a single extent on disk but by the time the log reaches the end of the disk the free space will have been fragmented into many small extents corresponding to the files that were deleted or overwritten. For a log structured file system to operate efficiently, it must ensure that there are always large extents of free space available for writing new data. In order to maintain large free areas on disk for fast writing, the log is divided into "segments" and a process called free space collection is used to compress the live information from fragmented segments.

Log structured file systems are described in "The Design and Implementation of a Log Structured File System" by M. Rosenblum and J. K. Ousterhout, ACM Transactions on Computer Systems, Vol. 10 No. 1, February 1992, pages 26–52.

Log structured disks (LSD) and log structured arrays (LSA) are disk architectures which use the same approach as the log structured file systems (LFS). The present invention applies equally to all forms of log structured storage systems including LSD, LSA and LSF systems.

A log structured array (LSA) has been developed based on the log structured file system approach but is executed in an outboard disk controller. Log structured arrays combine the log structured file system architecture and a disk array architecture such as the well-known RAID (redundant arrays of inexpensive disks) architecture with a parity technique to improve reliability and availability. RAID architecture is described in "A Case for Redundant Arrays of Inexpensive Disks (RAID)", Report No. UCBICSD 87/391, December 1987, Computer Sciences Division, University of California, Berkeley, Calif. "A Performance Comparison of RAID 5 and Log Structured Arrays", Proceedings of the Fourth IEEE International Symposium on High Performance Distributed Computing, 1995, pages 167–178 gives a comparison between LSA and RAID 5 architectures.

An LSA consists of a disk controller and N+1 physical disks. In an LSA, data is stored on disks in compressed form. After a piece of data is updated, it may not compress as well as it did before it was updated, so it may not fit back into the space that had been allocated for it before the update. The implication is that there can no longer be fixed, static locations for all the data. An LSA controller manages information storage to write updated data into new disk locations rather than writing new data in place. Therefore, the LSA must keep a directory which it uses to locate data items in the array.

As an illustration of the N+1 physical disks, an LSA can be considered as consisting of a group of disk drive DASDS, each of which includes multiple disk platters stacked into a column. Each disk is divided into large consecutive areas called segment-columns. A segment-column is typically as large as a physical cylinder on a physical disk. Corresponding segment-columns from the N+1 disks constitute a segment. The array has as many segments as there are segment-columns on a disk in the array. One of the segment-columns of a segment contains the parity (exclusive-OR) of the remaining segment-columns of the segment. For performance reasons, the parity segment-columns are not all on the same disk, but are rotated among the disks.

Logical devices are mapped and stored in the LSA. A logical track is stored, as a set of compressed records, entirely within some segment-column of some physical disk of the array; many logical tracks can be stored in the same segment-column. The location of a logical track in an LSA changes over time. A directory, called the LSA directory, indicates the current location of each logical track. The entire LSA directory is maintained in Non-Volatile Storage (NVS) in the disk controller, to avoid disk accesses when searching the directory.

Whether an LSA stores information according to a variable length format such as a count-key-data (CKD) architecture or according to a fixed block architecture, the LSA storage format of segment-columns is mapped onto the physical storage space in the disk drive units so that a logical track of the LSA is stored entirely within a single segment-column mapped onto a disk drive unit of the array. The size of a logical track is such that many logical tracks can be stored in the same LSA segment-column.

Reading and writing into an LSA occurs under management of the LSA controller. An LSA controller can include resident microcode that emulates logical devices such as direct access storage device (DASD) disk drives, or tape drives. In this way, the physical nature of the external storage subsystem can be transparent to the operating system and to the applications executing on the computer processor accessing the LSA. Thus, read and write commands sent by the computer processor to the external information storage system would be interpreted by the LSA controller and mapped to the appropriate disk storage locations in a manner not known to the computer processor. This comprises a mapping of the LSA logical devices onto the actual disks of the LSA.

A write received from the host system is first written into a non-volatile cache and the host is immediately notified that the write is done. The fraction of cache occupied by modified tracks is monitored by the controller. When this fraction exceeds some threshold, some number of modified tracks are moved (logically) to a memory segment, from where they get written (destaged) to disk. The memory segment is a section of controller memory, logically organized as N+1 segment-columns called memory segment-columns; N data memory segment-columns and 1 parity memory segment-column. When all or part of a logical track is selected from the NVS, the entire logical track is written into one of the N data memory segment-columns. When all data memory segment-columns are full, an XOR operation is applied to all the data memory segment-columns to create the parity memory segment-column, then all N+1 memory segment-columns are written to an empty segment on the disk array.

All logical tracks that were just written to disk from the memory segment must have their entries in the LSA directory updated to reflect their new disk locations. If these logical tracks had been written before by the system, the LSA directory would have contained their previous physical disk locations; otherwise the LSA directory would have indicated that the logical track had never been written, so has no address. Note that writing to the disk is more efficient in LSA than in RAID-5, where 4 disk accesses are needed for an update.

In all forms of log structured storage systems including the described log structured arrays (LSAs) and log structured file systems (LSFs), data to be written is grouped together into relatively large blocks (the segments) which are written out as a unit in a convenient free segment location on disk. When data is written, the previous disk locations of the data become free creating "holes" of unused data (or garbage)-in the segments on disk. Eventually the disk fills up with segments and it is necessary to create free segment locations by reading source segments with holes and compacting their still-in-use content into a lesser number of destination segments without holes. This process is called free space or garbage collection.

To ensure that there is always an empty segment to write to, the free space segments must be collected in the background. All logical tracks from a segment selected for free space collection that are still in that segment are read from disk and placed in a memory segment. In an LSA, they may be placed in the same memory segment used for destaging logical tracks written by the system, or they may be placed in a different memory segment or temporary storage buffer of their own. In any case, these logical tracks will be written back to disk when the memory segment fills. Free space collected segments are returned to the empty segment pool and are available when needed.

As free space collection proceeds, live data from the various target segments is read into the temporary storage buffer, the buffer fills up, and the live data is stored back into an empty segment of the disk array. After the live data in the temporary storage buffer is written back into the disk array, the segments from which the live data values were read are designated as being empty. In this way, live data is consolidated into a fewer number of completely full segments and new empty segments are created. Typically, free space collection is performed when the number of empty segments in the array drops below a predetermined threshold value.

The way in which target segments are selected for the free space collection process affects the efficiency of the operation of the log structured storage system. Three algorithms are used in the prior art, one called the "greedy" algorithm, one called the "cost-benefit" algorithm and one called "age-threshold" algorithm. The greedy algorithm selects target segments by determining how much free space will be achieved for each segment processed and then processes segments in the order that will yield the most amount of free space. The cost-benefit algorithm compares a cost associated with processing each segment against a benefit and selects segments for processing based on the best comparisons. The age-threshold algorithm selects segments for processing only if their age in the information storage system exceeds an age-threshold value and once past the age-threshold, the segments are selected in the order of least utilised segments first.

More particularly, the greedy algorithm selects segments with the smallest utilization first and moves the live tracks from partially filled segments to a target segment in a pool of empty segments. There are two problems with greedy selection: first, segments which are emptying quickly (call "hot" segments) will get collected when it might be more beneficial to leave them a little longer until they contain less still-in-use data; secondly, segments which are nearly full and are emptying extremely slowly or not at all (called "frozen" segments) may tie up free space for a long time (or indefinitely) before they are collected when it might be beneficial to reclaim that free space earlier.

In "The Design and Implementation of a Log-Structured File System" M. Rosenblum and J. K. Ousterhout, ACM Transactions on Computer Systems, Vol. 10 No. 1, February 1992, pages 26–52, the problem is considered of how to group live blocks of data when they are written out due to free space collection. One possibility considered is to try to enhance the locality of future reads, for example by grouping files in the same directory together into a single output segment. Another possibility is to sort the blocks by the time they were last modified and group blocks of similar age together into new segments. The idea is that tracks last written at around the same time have some temporal affinity, so it should be advantageous to have them together in the same segment.

The results of the locality grouping given in this paper were not very encouraging. This result was due to the form of free space collection algorithm being used in the analysis. A greedy algorithm does not work well with locality grouping as a segment does not get chosen for free space collection or cleaning until it becomes the least utilised of all segments. Thus every segment's utilisation eventually drops to the cleaning threshold, including very slowly changing "cold" segments. Unfortunately, the utilisation drops very slowly in cold segments, so these segments tend to linger just above the cleaning point for a very long time. With locality, many more segments cluster around the cleaning point for a very long time. The overall result is that cold segments tend to tie up large numbers of free blocks for long periods of time.

The above paper also tried using age-grouping with the cost-benefit algorithm with more promising results. In order to sort live blocks by age, the segment summary information records the age of the youngest block written to the segment. A single modified time was kept for the entire file and this estimate would be incorrect for a file not modified in its entirety. The paper suggests that a modification of the segment summary information could be made to include modified times for each block of data.

In "An Age-Threshold Algorithm for Garbage Collection in Log-Structured Arrays and File Systems" J. Menon and L. Stockmeyer, RJ 10120 (91936) May 12, 1998 Computer Science, the possibility of reorganising live tracks collected by the age-threshold free space collection algorithm before packing them into segments is considered. Again the method considered is to group together tracks of similar age i.e. tracks that were last written at around the same time.

There are a number of issues to consider when designing a free space collection algorithm all of which will affect the efficiency of the free space collection process.

DISCLOSURE OF THE INVENTION

The aim of the present invention is to improve free space collection efficiency by sorting data into segments on initial write, rewrite and relocation during free space collection which results in improved free space collection efficiency over an unsorted design.

According to a first aspect of the present invention there is provided a method for sorting data for storage in an information storage system having storage devices in which information segments are located, the method comprising the steps of: determining the expected time until the next rewrite of a unit of data; sorting the units of data into streams according to the expected time; destaging a segment made up of units from a single stream to one of the storage devices.

Preferably, the information storage system is a log structured storage system.

The units of data may be initial writes, rewrites and relocations due to free space collection. The expected time until the next rewrite of a unit of data may be determined from the characteristics of the workload of the storage system if this is known. Alternatively, the expected time until the next rewrite of a unit of data may be estimated assuming that units of data are written independently and that writes for a particular unit of data arrive with a Poisson distribution.

Preferably, the units of data are sorted into different subsets of streams depending on if they are rewritten units of data or units of data being relocated due to free space collection. As a first order estimate, the units of data being rewritten may be sorted by an estimated unit write interval equal to the time since the unit was last written and units of data being relocated due to free space collection may be sorted by the unit age. The estimated unit write interval and the unit age may be measured in segment destage writes.

The streams may have fixed boundaries, with the boundaries increasing exponentially or with the boundaries chosen empirically by experimenting to find good boundary values and using them. Alternatively, the streams may have dynamic boundaries which move in accordance with an ongoing average of the sorted data. The dynamic boundaries may be governed by a binary decision tree.

Units of data which are initial writes may be sorted in a dedicated stream or, alternatively, may be sorted with the rewrite units of data.

According to a second aspect of the present invention there is provided an information storage system comprising a storage controller and storage devices in which information segments are located, the storage controller including: means for determining the expected time until the next rewrite of a unit of data; a plurality of streams for sorting the units of data according to the expected time; means for destaging a segment made up of units from a single stream to one of the storage devices.

The information storage system may be a log structured file system, a log structured array or another form of log structured storage system.

According to a third aspect of the present invention there is provided an information storage system comprising a storage controller and storage devices in which information segments are located, the storage controller performs a sorting process by performing the steps of: determining the expected time until the next rewrite of a unit of data; sorting the units of data into streams according to the expected time; destaging a segment made up of units from a single stream to one of the storage devices.

BRIEF DESCRIPTION OF THE DRAWINGS

An embodiment of the present invention will now be described, by way of example only, with reference to the accompanying drawings in which.

DESCRIPTION OF THE PREFERRED EMBODIMENTS

For the purposes of a detailed illustration of a particular embodiment of the present invention, a log structured array (LSA) is described; however, the present invention can apply equally to all other forms of log structured storage systems including log structured file systems and log structured disks.

Figure 1:
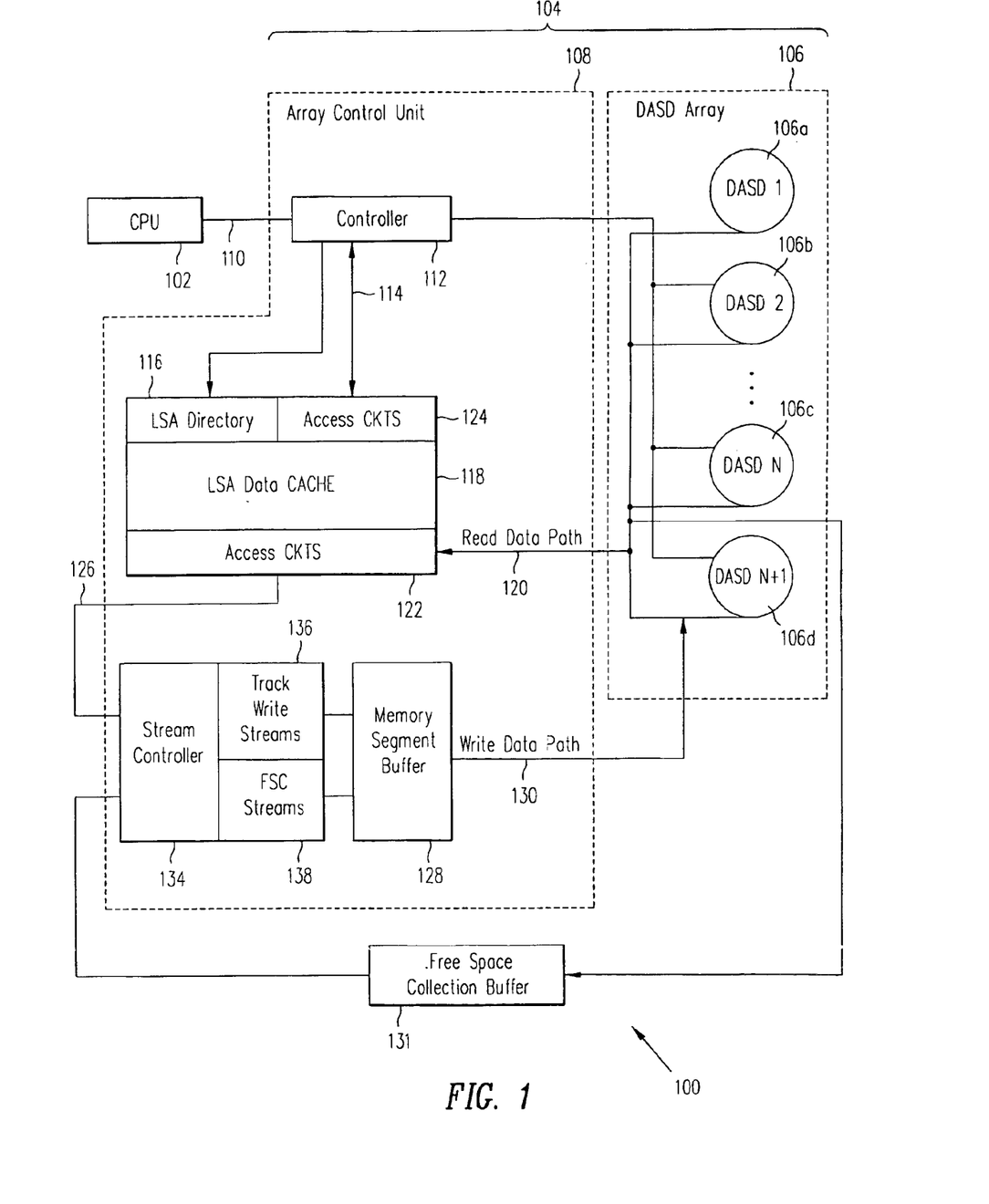
FIG. 1 is a representation of a computer system constructed in accordance with the present invention.

FIG. 1 shows a preferred embodiment of a computer system 100 constructed in accordance with the present invention. The system 100 includes a processor 102 or host computer that communicates with an external information storage system 104 having N+1 direct access storage devices (DASD) in which information is maintained as a log structured array (LSA). In FIG. 1, an array 106 comprising four DASDs 106a, 106b, 106c, and 106d is shown for illustration, but it should be understood that the DASD array may include a greater or lesser number of DASD. A control unit 108 controls the storage of information so that the DASD array 106 is maintained as an LSA. Thus, the DASD recording area is divided into multiple segment-column areas and all like segment-columns from all the DASDs comprise one segment's worth of data. The control unit 108 manages the transfer of data to and from the DASD array 106 so that periodically it considers segments for free space and selects target segments according to some form of algorithm, e.g. the greedy algorithm, the cost-benefit algorithm or the age-threshold algorithm all as known from the prior art, or any other form of free space collection algorithm.

The processor 102 includes (not illustrated): one or more central processor units, such as a microprocessor, to execute programming instructions; random access memory (RAM) to contain application program instructions, system program instructions, and data; and an input/output controller to respond to read and write requests from executing applications. The processor 102 may be coupled to local DASD (not illustrated) in addition to being coupled to the LSA 104. Typically, an application program executing in the processor 102 may generate a request to read or write data, which causes the operating system of the processor to issue a read or write request, respectively, to the LSA control unit 108.

When the processor 102 issues a read or write request, the request is sent from the processor to the control unit 108 over a data bus 110 and is received in the control unit by a controller 112. In response, the controller produces control signals and provides them over a controller data path 114 to an LSA directory 116 and thereby determines where in the LSA the data is located, either in a non-volatile LSA data cache 118 or in the DASD 106. The LSA controller 112 comprises one or more microprocessors with sufficient RAM to store programming instructions for interpreting read and write requests and for managing the LSA 104.

The controller 112 includes microcode that emulates one or more logical devices so that the physical nature of the external storage system (the DASD array 106) is transparent to the processor 102. Thus, read and write requests sent from the processor 102 to the storage system 104 are interpreted and carried out in a manner that is otherwise not apparent to the processor. In this way, one or more logical (virtual) devices are mapped onto the actual DASDs of the array 106 by the array control unit 108.

As the controller 112 maintains the stored data as an LSA, one or more logical tracks can be stored entirely within a segment-column of one of the DASDS 106a, 106b, 106c, 106d. Over time, the location of a logical track in the DASD array can change. The LSA directory 116 has an entry for each logical track, to indicate the current DASD location of each logical track. Each LSA directory entry for a logical track includes the logical track number, the actual DASD drive number and segment-column number within the DASD, the starting sector within the column at which the logical track starts, and the length of the logical track in sectors.

Data is transferred between the processor 102 and the LSA 104 during read operations over a path including a read data path 120, DASD access circuits 122, the LSA data cache 118, controller access circuits 124, the controller data path 114, the controller 112, and the data bus 110.

When the controller 112 receives a read request for data in a logical track, it determines the logical track in which the data is stored, examines the LSA directory 116, and determines the DASD number, starting sector, and length in sectors to which the logical track is currently mapped. The controller then reads the relevant sectors from the corresponding DASD unit of the N+1 units in the array 106.

New write data and rewrite data are transferred from the processor 102 to the controller 112 of the LSA 104. The new write and rewrite data are sent via the controller data path 114 to the controller access circuits 124 and are stored in the LSA data cache 118. Details of the new write data and the rewrite data are sent to the LSA directory 116. If the data is rewrite data, the LSA directory will already have an entry for the data, this entry will be replaced by an entry for the new data. The data which is being rewritten is now dead and the space taken by this data can be reused once it has been collected by the free space collection process.

The new write data and the rewrite data leave the LSA data cache 118 via DASD access circuits 122 and data path 126 and are ordered into track write streams 136 in a memory buffer by a stream controller RAM 134. The ordering of the data into streams will be described in detail below.

When an individual stream of the track write streams 136 contains a segment's worth of data, the stream is discharged into a memory segment buffer 128 and the data is written into contiguous locations of the DASD array 106.

Although the inclusion of an LSA data cache 118 as described above can improve the overall performance of an LSA system, it should be understood that the inclusion of the data cache 118 is not essential. New write data and rewrite data could go directly to the streams 136.

The smallest unit of data that can be written by the processor 102 is called a track, and a predetermined number of tracks comprise a segment. At any time, a track is live, or current, in only one segment.

As data writing proceeds to the DASD in this manner, the DASD storage in the LSA becomes fragmented. That is, after several sequences of destaging operations, there can be many DASD segments that are only partially filled with live tracks and otherwise include dead tracks. This affects an LSA operating statistic referred to as utilization.

At any time, the utilization of a segment is the fraction of the segment containing live tracks. Thus, if a segment contains L live tracks and if the segment capacity is C tracks, then the utilization of the segment is given by:

$$\text{Utilization} = L/C$$

The writing process described above will eventually deplete the empty segments in the DASD array 106.

Therefore, a free space collection process is performed to create empty segments. Free space collection is carried out by choosing a certain number of partially-filled target segments in DASD and compacting the live tracks in these segments into a fewer number of full segments, thereby creating empty segments. For example, if free space collection is performed on three partially empty segments, and each has a 2/3 utilization rate, then the live tracks can be collected and reorganized into two full segments and one completely empty segment that is ready to receive new data. Thus, a net increase of one empty segment is created by the free space collection process. To ensure that an empty segment is always available in the DASD array 106, the array control unit 108 periodically performs the free space collection process on segments in the LSA. The free space collection process is typically a low priority, background process.

The target segments are collected in a free space collection buffer 131 for compaction. The live tracks taken from the free space collected segments are transferred into FSC streams 138 each of which can hold up to one segment of data. Live tracks that were taken from free space collected segments for the purpose of compaction are processed by a stream controller RAM 134 which designates into which of the streams 138 the tracks should go to. The process of designation of streams is discussed in detail below. When one of the streams of the FSC streams 138 is filled to capacity i.e. it holds a segment's worth of tracks, the contents of the stream is written from the stream to the memory segment buffer 128 and from there to an empty segment in the DASD array via the write data path 130.

The controller 112 accumulates the data to be written in the memory segment buffer 128, which can store N+1 segment-columns to form one complete segment. Each segment comprises N segment-columns of data (user information) and one segment-column of parity data. When the memory segment buffer 128 is full, a parity segment-column is generated by performing an exclusive-OR operation over all of the N data segment-columns in the segment. Next, the N+1 segment-columns are written to an empty segment in the DASD array 106, and the LSA directory entries for all logical tracks that were written to DASD from the memory segment buffer 128 are updated to reflect the new DASD locations.

Figure 2:
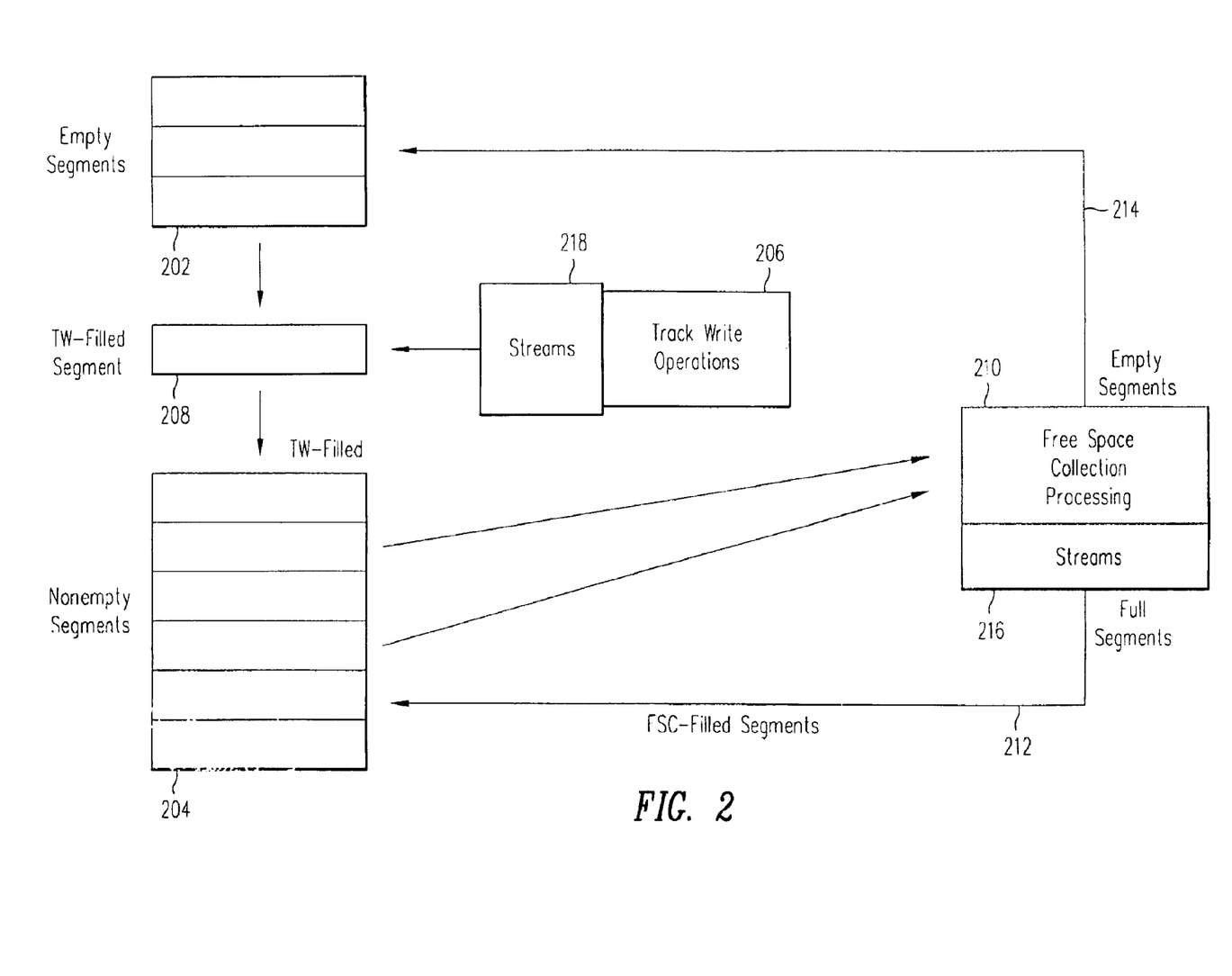
FIG. 2 is a block diagram representation of the free space collection process performed by the computer system illustrated in FIG. 1.

The storage area in the LSA 104 can be considered as a collection of segments whose configuration changes from filled to empty and back again. FIG. 2 illustrates this configuration. The storage area in the DASD array 106 is organised into segments. These segments may be completely empty (as represented in FIG. 2 as a pool or queue of empty segments 202) or may contain a mixture of live data and dead data tracks (represented in FIG. 2 as the pool of non-empty segments 204). New write data, rewrite data and live data which has been taken from free space collected segments is sorted into streams 216, 218. When a segment's worth of data is in a single stream, it is transferred to the next available empty DASD segment. This processing is represented in FIG. 2 by an empty DASD segment receiving track write operations 206 via streams 218 to become a track-write-filled (TW-filled) segment 208. The TW-filled segment thereby joins the ranks of the non-empty segments. Free space collection processing 210 therefore is understood as collecting partially-filled, non-empty segments 204 and creating both completely filled segments as designated by the free space filled (FS-filled) segments path 212 and segments completely emptied as designated by the empty segments path 214. Again, the free space filled segments are sorted into streams 216 before entering the FS-filled segments path 212 to return to the DASD array 106.

The performance of a free space or garbage collection algorithm can be measured by the average utilization of the garbage collected segments. This measure is called garbage collection utilization (GCU). This is a reasonable measure of performance since small GCU means that the garbage collector is doing a good job of collecting free space, at an average of C(1−GCU) per collected segment where C is the segment capacity in tracks.

The main idea of the invention is to sort data into streams 136, 138 which then go into separate segments based on the expected time until the next rewrite of the data such that data which is expected to be rewritten over a given short period of time in the future is arranged together in a segment. By arranging the data in this way segments are created which make the transition from being full to being empty (i.e. full of holes) in a short period of time which skews the LSA's/LSF's distribution of segment utilisations such that the free space collection process is provided with a better choice of less-full segments to select for free space collection.

The estimator (for the expected time to the next write of a particular unit of data) chosen for use in the method of sorting data should be determined by what is known about the log structured storage system workload when the storage system is designed. For an unknown workload, it is possible to assume that units of data are written independently and that writes for a particular unit of data arrive with a Poisson distribution with an unknown mean write-rate.

Under these assumptions, the expected time to the next write can be estimated by determining a mean write interval (by taking the mean of the intervals between previous writes of a given unit or track of data) and subtracting the time interval since the data was last written. The memory required to make this estimate can be progressively reduced (and the estimate made less accurate) by choosing to record less and less write history per unit of data to the point where only one write interval is known when the data is rewritten and only the approximate time interval since the last write is known when the data is relocated during free space collection. The latter extreme requires only a single number to be recorded as write history per segment: the write time for segments containing newly written or rewritten data and a weighted average of write times of contributing segments for destination free space collection segments.

Once an estimate of the expected time to the next write has been found for a unit of data the controller sorts the unit of data into a 'stream' where it waits until the stream contains enough units of data to make up a segment. When this condition is met, a segment is written out containing the data in the stream and the stream is emptied. If multiple streams are implemented, data which is likely to be rewritten in the near future can be separated from data which is likely to be rewritten at a later time.

In the described embodiment, the units of data are tracks. A stream is a logical sequence of segments which will be filled with tracks of a certain 'type'. Streams are implemented using a first-in first-out (FIFO) data-structure containing references to tracks which are waiting to be put into a segment for the first time or moved from the segment they are currently in into a different segment. When the FIFO contains references to enough tracks to fill a segment, a copy of each referenced track is put into a segment, the references are removed from the FIFO and the original locations of the tracks (if any) become free. The most important property of a stream is that only one type of track goes into the segments in any stream.

A destage stream is a stream used for tracks which are being put into a segment as a result of track writes to the array. The track writes may be initial data writes of data being written for the first time or data rewrites.

A free space collection stream is a stream used for tracks which are being moved from a source free space collection segment to a destination free space collection segment.

Given total knowledge of the future order of track writes and unlimited processing power it can be seen that it would be possible to perform perfect segment filling and free space collection source segment selection for a log structured storage system. Segment filling occurs in two places so there are three separate processes which would have to be controlled:

1. The arrangement of destaged tracks into empty segments: destage segment filling.
2. The arrangement of free space collected tracks into empty segments: free space collection segment filling.
3. The selection of source free space collection segments: segment selection.

In order to achieve the lowest possible GCU, the perfect system would fill destage segments such that (wherever possible) track rewrites would create completely empty segments in time to avoid the invocation of free space collection. Similarly, when free space collection had to be invoked, the perfect system would fill free space collection segments such that (whenever possible) track rewrites would again create completely empty segments in time to avoid future generations of free space collection.

With only a single destage or free space collection stream it would not be possible to control the arrangement of tracks into different segments; they would have to be put into segments in the order of arrival. Multiple destage and free space collection streams are required to arrange tracks so that segments become completely free due to later track rewrites.

A perfect solution for a known sequence of track writes could be found by evaluating the GCU for every possible sequence of segment selection with every combination of arrangement of tracks and selecting the solution with the lowest GCU.

The idea of a perfect solution is useful because it makes the following facts obvious:

Good segment filling algorithms will help lower the GCU by sorting tracks into multiple streams based on when they will next be rewritten.

Segment selection for free space collection can influence the GCU in two ways:

1. The segment utilisation on selection affects the GCU directly.
2. The tracks in the selected segment which are still valid on segment selection affect the GCU indirectly according to how they are sorted into free space collection streams and when they are next rewritten.

A practical log structured array implementation does not have the luxury of infinite processing power and knowledge of the future sequence of track writes but does have some processing power and can estimate the future distribution of track writes by analysing the distribution of track writes in the past. Any estimate of track write distribution has to be based on history stored in the array controller (or possibly on the array itself) and the accuracy of the estimate would necessarily be traded-off against the amount of history stored and the amount of processor overhead required to keep the estimate current.

In practice, therefore, segment filling and selection algorithms are used which are a good compromise between free space collection efficiency, processor overhead and the space required for the write history.

The sorting of tracks into streams using a segment filling algorithm aims to achieve maximal separation in the distribution of segment utilisations such that there are a large number of nearly full segments and some nearly empty ones with not very many partially full segments in between. In other words, segments should change from being nearly full to nearly empty over a short period of time. In order to achieve this tracks are grouped together into segments such that any individual segment contains tracks which were rewritten later over a short period of time.

It would be possible to approach this problem by analysing track write traces of real I/O workloads to determine a set of models for writes to individual tracks. The segment filling algorithm could maintain a certain amount of write history for each track, use the track write models to estimate an expected time to the next write of the track for each model and use the Bayesian evidence for each model to weight the estimates to determine a combined best estimate for the expected time to the next write of the track. The segment filling algorithm could then sort tracks into streams by expected time to next write.

Realistically, the cost of maintaining write history on a per-track basis (in view of the fact that it would have to be stored in controller RAM to avoid having to read it before destaging a track) is prohibitive as are the overheads of performing the estimation.

In the method described herein, the overhead of the solution is limited by assuming a single model for writes to individual tracks i.e. that writes to a particular track arrive with a Poisson distribution independently of writes to any other track. With a single assumed model it is unnecessary to analyse traces or weight model estimates. The amount of controller RAM allocated to the segment filling algorithm is restricted to a small amount of information stored on a per-segment basis.

Given the assumptions of independent track writes and Poisson arrivals, the segment filling algorithm was considered with tracks sorted into segments by the Poisson distribution parameter $\lambda$ being the mean write rate of the track.

The parameter $\lambda$ is estimated by assigning each destage segment a destage sequence number from a monotonically increasing series when it is written. The destage sequence numbers for free space collection destination segments are set as equal to the greatest destage sequence number of any segment which contributed tracks to those segments. The destage sequence number for each segment has to be stored in controller RAM and constitutes the small amount of per-segment information allowed for the segment filling algorithm. When a track is rewritten, the difference between the destage sequence number of the segment which was the previous location of the track and the current destage sequence number at that time gave the interval (measured in segment writes) between two successive writes to the track. The best estimate of $\lambda$ given only one interval is simply the inverse of the interval.

If more controller RAM is used, more history per segment can be recorded. In this example one interval is assumed to be the best compromise.

On free space collection of a segment, tracks are not being rewritten so there is only half an interval (i.e. it is known that a track was written a specific number of segment writes ago and has not been rewritten since). In this situation the best estimate of $\lambda$ is inversely proportional to the number of segment writes since the last write of the track. Again, It would be possible to get a better estimate of $\lambda$ given some more history (with free space collection the history could be stored in the segment on disk and would not require controller RAM) but again, it is assumed that the smallest viable amount of information is the best compromise.

In the described embodiment, a division is optimised away by sorting on track write interval and track age instead of for $\lambda$ for destage (or rewrite data) and free space collected data respectively. In this way, the estimate has been simplified to the next lifetime between writes being the same length as the last lifetime between writes for that track.

The track write interval in the case of sorting destaged tracks and the track age in the case of sorting free space collected tracks are referred to as the sort key. The current destage sequence number is incremented just after it was used so the lowest sort key is one rather than zero.

Having established how to estimate the sort key it is necessary to determine how to assign destage or free space collection streams to ranges of sort keys; the following requirements have to be satisfied:

It has to be possible to map the whole range of sort keys into streams.

There has to be a reasonably small limit on the number of streams required.

Simulations have shown that in general the free space collection efficiency improves as the number of streams increases up to and beyond 32 streams for rewritten data and an independent set of 32 streams for free space collected data.

A basic estimate of a good fixed stream assignment can be obtained by assigning streams exponentially such that tracks with the first key were sorted into the first stream, tracks with keys two and three were sorted into the second stream, tracks with keys three, four, five, six and seven were sorted into the second stream and so on. This limits the number of streams required to the number of bits in the destage sequence number. An option to halve (and then quarter . . . ) the number of streams by merging neighbouring pairs can also be implemented.

Explained in another way, the first stream is assigned an expected time to next write of 0–1 time units, the second to 1–3 units, the third to 3–7 units, the fourth to 7–15 units and so on exponentially until an implementation defined limit is reached.

This fixed stream assignment would be a good candidate because it would be simple and efficient to implement (a 'count leading zeros' instruction, for instance 'cntlzw' for a PowerPC, on the fast-path) and the stream width is inversely proportional to the stream rate.

Simulation shows that it is possible to fix the boundaries between streams but that it is preferable to assign the stream boundaries dynamically such that they adjust to the current workload.

The fixed stream assignment above had the disadvantages that tracks which were written out at different rates where the rates were within a factor of two of each other fell into the same stream and streams for very old and very young tracks were not well utilised.

A dynamic stream assignment approach solves these problems by moving stream boundaries appropriately. A binary decision tree can be used which keeps track of the relatively long term average value of the sort keys passing through each node and sends tracks left or right according to whether their sort keys are above or below the average for that node. Segment filling streams process tracks falling from the leaf nodes of the decision tree. The decision tree has n levels and n is chosen to give the desired number of streams. Each node of the decision tree records a value to compare with sort keys. The value is updated by multiplying by a decay parameter and adding a fraction (1−Decay) of the current sort key. The decay parameter at the leaf level of the tree is calculated from a simulation input parameter (which specifies how many segments have to pass through a leaf node to move its stream boundary most of the way to the steady-state value) and this value is square-rooted for successively higher levels Experiment shows that (as expected) the simulation results are insensitive to the Decay parameters provided they are large enough that destage stream boundaries are adjusted significantly more slowly than segments in the streams are filled. Simulations show that setting Decay equal to 1/(10*UnitsOfDataPerSegment) works well.

With the fixed stream assignment, tracks might wait in a destage stream for an arbitrarily long time before being destaged; the dynamic stream assignment approach also solves this problem because eventually stream boundaries will shift to maintain a trickle of segments in all streams.

Given the assumption of an unknown workload it is not possible to estimate the expected time to next write for data which is being written for the first time. There are two methods for dealing with data in this category: this data can be assigned a stream for its exclusive use or alternatively it can be assumed that the data was last written at time zero. The invention can be implemented using either of these techniques.

Figure 3:
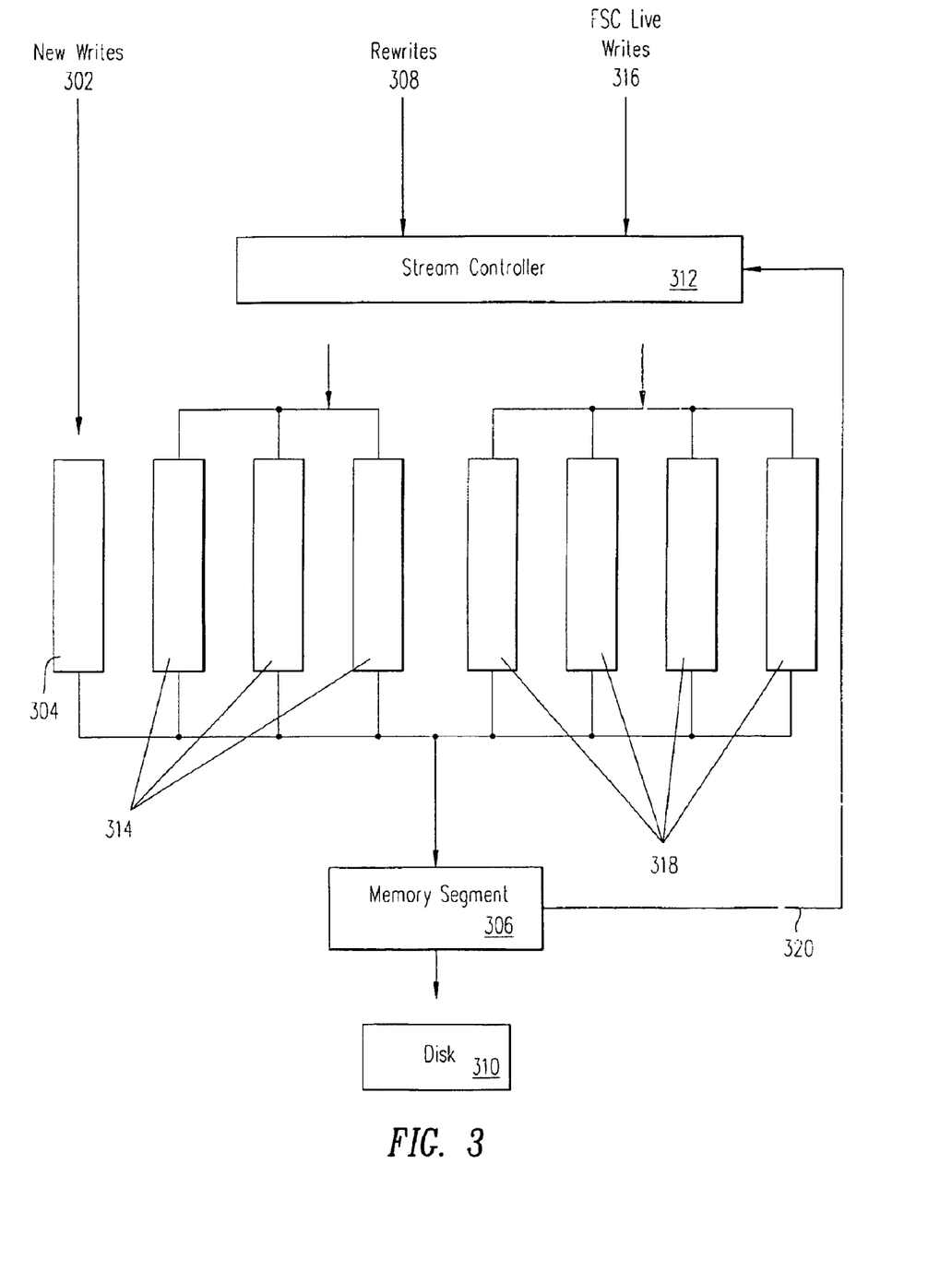
FIG. 3 is a block diagram representation of the data sorting process in accordance with the present invention.

FIG. 3 shows a diagrammatic representation of the sorting of tracks of data into streams in a log structured storage system. When a new write track 302 is written from the processor, it is directed into a stream 304 in which it waits in a FIFO list. New write tracks 302, in this example, have a dedicated stream 304 which only includes new write tracks. In another embodiment, new write tracks can be treated with rewrite tracks and put into mixed streams with the rewrite tracks. The new write tracks 302 accumulate in the stream 304 until there are enough tracks in the stream 304 to fill a segment. In the case of an LSA, the new write tracks 302 are then moved to a memory segment 306 in which they are arranged in N segment-columns and a parity value is calculated and allocated to an N+1th segment-column, the new segment is then destaged to its disk location 310. In an LSF, the segment's worth of new write tracks can be moved directly from the stream 304 to disk 310. When it is destaged to disk the segment is allotted a destage sequence number. The destage sequence number 320 for each segment is stored in the stream controller RAM 312.

Rewritten tracks 308 sent by the processor are handled by a stream controller 312 in the form of a controller RAM. The stream controller 312 has a record of the destage sequence number of the segment which previously held the rewritten data and the stream controller 312 deducts the current destage sequence number providing an interval (measured in segment writes) for the rewritten track. The track write interval for the rewritten track is used as an estimate of the expected time until the track is rewritten again. The controller 312 sorts the rewritten tracks 308 by allocating the track to a stream from the group of destage streams 314. FIG. 3 shows a limited number of streams 314, in practice many more streams 314 are used. Newly written tracks may be sorted with rewritten tracks, instead of in a dedicated stream, if it is assumed that they were last written at time zero. The destage sequence number at the time of writing the new segment to disk is recorded for the segment in the stream controller 312 so that when a track in the new segment is again rewritten the last interval between writes of the track can be calculated.

As with the stream 304 for the new write tracks 302, the destage streams 314 are FIFO lists and a stream is emptied once it contains a segment's worth of tracks in it. In the case of an LSA, the stream is emptied into a memory segment 306 for parity calculation and from there the new segment proceeds to disk 310. In an LSF, the memory segment 306 is not required and the segment can be destaged directly to disk 310. When it is destaged to disk the segment is allotted a destage sequence number. The destage sequence number 320 for each segment is stored in the stream controller RAM 312.

Live tracks which have been collected from segments which have been selected for free space collection are ordered into a separate set of streams 318 by the stream controller 312. The FSC live tracks 316 are sent from a free space collection buffer to the stream controller 312. FSC live tracks 316 are not being rewritten so a complete rewrite interval is not available. The stream controller 312 sorts the tracks by the number of segment writes since the last write of the FSC live track and allocates the track to a stream from the group of FSC streams 318. FIG. 3 shows a limited number of FSC streams 318, in practice many more streams 318 are used. The FSC streams 318 are separate streams to the streams 314 into which rewritten tracks 308 are sorted.

As with the other forms of streams 304, 314, the FSC streams 318 are FIFO lists and a stream is emptied once it contains a segment's worth of tracks. In the case of an LSA, the stream 318 is emptied into a memory segment 306 for parity calculation and from there the new segment proceeds to disk 310. In an LSF, the memory segment 306 is not required and the segment can be destaged directly to disk 310. When it is destaged to disk the segment is allotted a destage sequence number.

A weighted average of the write times of tracks making up the new segment is recorded in the stream controller 312 so that when a track in the segment is again rewritten, the last interval between writes can be established. Individual write times for tracks could be recorded but this would require extra processing overhead. A weighted average of write times means that only one number needs to be recorded per new segment.

The streams 304, 314, 318 are in a write buffer in the form of non-volatile RAM. In general there would be a slightly different optimal number of streams for any given implementation as each additional stream provides less benefit than the previous one and requires RAM and other resources which could be used to improve the system efficiency in some other way. Eventually, the benefit provided by having another stream is equal to the benefit you would get by allocating the resources used by the stream to something else and so an optimal point is reached. This optimal point depends on the scarcity of the resources used by the stream and how much benefit they could provide elsewhere which is implementation dependent. Most of the effect comes from a relatively small number of streams. From simulations, the efficiency continues to improve slightly after 16 streams and was still improving fractionally at 32 streams. For very large systems, larger numbers of streams might prove fractionally beneficial. Experiments have shown that sixteen destage streams 314 and sixteen FSC streams 318 are a good conservative point for real implementations and are therefore an acceptable number of streams for most cases.

Figure 4:
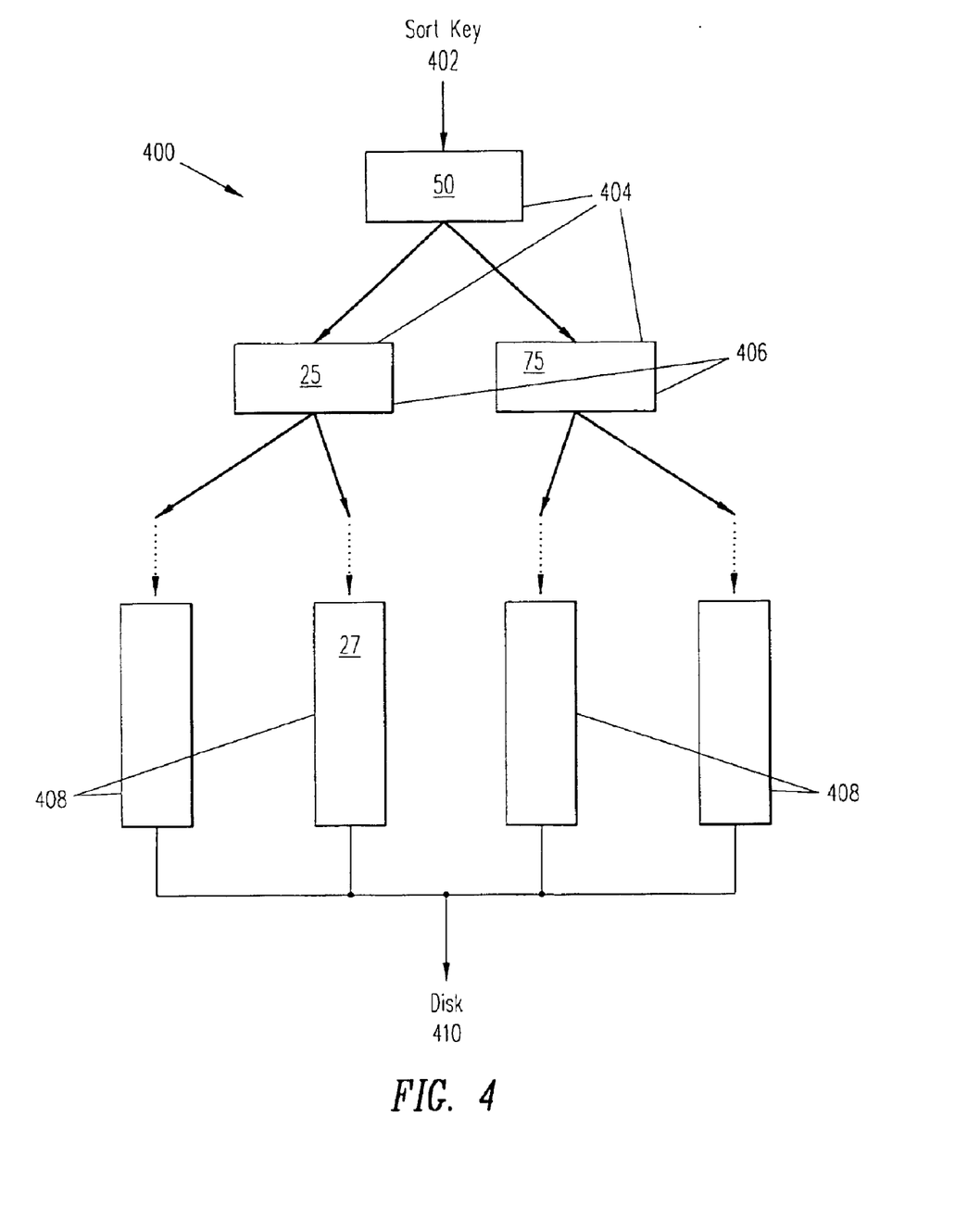
FIG. 4 is a block diagram representation of the dynamic stream sorting process in accordance with the present invention.

The stream controller RAM 312 also controls the boundaries of the streams 314, 318 if dynamic stream assignment is used. FIG. 4 is a simplified representation of a binary decision tree 400. The sort key 402 for a rewritten track or a FSC live track, which are the track write interval and track age respectively, passes though each node 404 of the tree 400. At each node 404 the track is sent left or right depending on whether the sort key for that track is above or below the average for that node 404. The node averages are constantly updated. The number of nodes 404 is chosen in relation to the number of streams 408, e.g. two levels of nodes are needed for four streams 408. The tracks exiting the tree 400 from the leaf nodes 406 enter streams 408 from where they proceed to disk 410 as described above.

As an illustration, a sort key of value 27 is shown in FIG. 4 as an arbitrary but reasonable value. The average for the first node is 50, so as the sort key of 27 is less than the average the sort key is directed to the left to a node in the second level of nodes. In the second level of nodes, the node has an average of 25 so the sort key of 27 is greater than the average and is directed right into a stream.

"An Age-Threshold Algorithm for Garbage Collection in Log-Structured Arrays and File Systems" J. Menon and L. Stockmeyer, RJ 10120 (91936) May 12, 1998 Computer Science describes an earlier attempt to sort data into segments on free space collection. The invention has the advantage over that attempt that it allows data to wait in a stream for an unlimited amount of time which improves the sorting effectiveness. In the age-threshold system, a set of tracks is collected in a group and then the whole group is sorted and written out again. In other words, the sorting is done in batches and the number of very infrequently written tracks that can be collected into a segment is limited to the number in a batch.

The present method the sorting is continuous and allows tracks which are written very infrequently to wait around for a long time in a stream until the stream collects enough very infrequently written tracks to fill a complete segment. A large number of segments of frequently written tracks may be collected whilst a single segment's worth of very infrequently written tracks is accumulating. This results in segments with a narrow distribution of write-rates.

The present method also sorts rewritten data (as opposed to just free space collected data) and it is this which brings about the majority of the benefit.

The advantage of using the invention is the improved efficiency of free space collection which results in an improved throughput/cost ratio for log structured storage systems such as LSAs or LSFs.

Modifications and improvements can be made to the foregoing without departing from the scope of the present invention.

What is claimed is:

1. A method for sorting data for storage in an information storage system having storage devices in which information segments are located, the method comprising the steps of:

determining an expected time until a next rewrite of a unit of data;
    sorting a plurality of units of data into a plurality of streams according to the expected time of each unit of data; and
    destaging a segment comprising a plurality of sorted units of data from one of the streams to one of the storage devices.

2. A method as claimed in claim 1, wherein the information storage system is a log structured storage system.

3. A method as claimed in claim 1, wherein each unit of data comprises initial writes, rewrites, and relocations due to free space collection.

4. A method as claimed in claim 1, wherein the expected time until the next rewrite of the unit of data is determined from the characteristics of the workload of the storage system.

5. A method as claimed in claim 1, wherein the expected time until the next rewrite of the unit of data is estimated assuming that units of data are written independently and that writes for a particular unit of data arrive with a Poisson distribution.

6. A method as claimed in claim 1, wherein each unit of data is selectively sorted into different subsets of streams if they are rewritten units of data or units of data being relocated due to free space collection.

7. A method as claimed in claim 6, wherein each unit of data being rewritten is sorted by an estimated unit write interval equal to the time since the unit was last written.

8. A method as claimed in claim 6, wherein each unit of data being relocated due to free space collection is sorted by a unit age.

9. A method as claimed in claim 7, wherein the estimated unit write interval and the unit age are measured in segment destage writes.

10. A method as claimed in claim 1, wherein the streams have fixed boundaries.

11. A method as claimed in claim 10, wherein the boundaries increase exponentially.

12. A method as claimed in claim 10, wherein the boundaries are fixed empirically.

13. A method as claimed in claim 1, wherein the streams have dynamic boundaries which move in accordance with an ongoing average of the sorted units of data.

14. A method as claimed in claim 13, wherein the dynamic boundaries are governed by a binary decision tree.

15. A method as claimed in claim 3, wherein units of data which are initial writes are sorted in a dedicated stream.

16. An information storage system comprising a storage controller and storage devices in which information segments are located, the storage controller including:

a means for determining an expected time until a next rewrite of a unit of data;
    a means for sorting a plurality of units of data into a plurality of streams according to the expected time of each unit of data; and
    a means for destaging a segment comprising a plurality of sorted units of data from one of the streams to one of the storage devices.

17. An information storage system as claimed in claim 16, wherein the information storage system is a log structured storage system.

18. An information storage system as claimed in claim 16, wherein each unit of data comprises initial writes, rewrites, and relocations due to free space collection.

19. An information storage system as claimed in claim 16, wherein the expected time until the next rewrite of the unit of data is determined from the characteristics of the workload of the storage system.

20. An information storage system as claimed in claim 16, wherein the expected time until the next rewrite of the unit of data is estimated assuming that units of data are written independently and that writes for a particular unit of data arrive with a Poisson distribution.

21. An information storage system as claimed in claim 16, wherein each unit of data is selectively sorted into different subsets of streams if they are rewritten units of data or units of data being relocated due to free space collection.

22. An information storage system as claimed in claim 17, wherein each unit of data being rewritten is sorted by an estimated unit write interval equal to the time since the unit was last written.

23. An information storage system as claimed in claim 17, wherein each unit of data being relocated due to free space collection is sorted by a unit age.

24. An information storage system as claimed in claim 22, wherein the estimated unit write interval and the unit age are measured in segment destage writes.

25. An information storage system as claimed in claim 16, wherein the streams have fixed boundaries.

26. An information storage system as claimed in claim 25 wherein, the boundaries increase exponentially.

27. An information storage system as claimed in claim 25 wherein, the boundaries are chosen empirically.

28. An information storage system as claimed in claim 16, wherein the streams have dynamic boundaries which move in accordance with an ongoing average of the sorted units of data.

29. An information storage system as claimed in claim 28, wherein the dynamic boundaries are governed by a binary decision tree.

30. An information storage system as claimed in claim 18, wherein units of data which are initial writes are sorted in a dedicated stream.

31. An information storage system as claimed in claim 16, wherein the information storage system is a log structured file system.

32. An information storage system as claimed in claim 16, wherein the information storage system is an external storage system and is a log structured array.

33. An information storage system comprising a storage controller and storage devices in which information segments are located, the storage controller performs a sorting process by performing the steps of:

determining an expected time until a next rewrite of a unit of data;

sorting a plurality of units of data into a plurality of streams according to the expected time of each unit of data; and destaging a segment comprising a plurality of sorted units of data from one of the streams to one of the storage devices.

* * * * *